United States Patent
Mohanty et al.

(10) Patent No.: US 7,809,355 B2
(45) Date of Patent: Oct. 5, 2010

(54) TECHNIQUES FOR IDENTIFICATION OF CONNECTED AND IDLE MODE USERS IN WIRELESS NETWORKS

(75) Inventors: Shantidev Mohanty, Hillsboro, OR (US); Muthaiah Venkatachalam, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 534 days.

(21) Appl. No.: 11/691,787

(22) Filed: Mar. 27, 2007

(65) Prior Publication Data

US 2008/0102865 A1    May 1, 2008

Related U.S. Application Data

(60) Provisional application No. 60/854,887, filed on Oct. 26, 2006.

(51) Int. Cl.
*H04M 1/66* (2006.01)
*H04M 1/68* (2006.01)
*H04M 3/16* (2006.01)

(52) U.S. Cl. ............... 455/411; 455/434; 455/466
(58) Field of Classification Search ............ 455/39, 455/41.2, 514, 515, 517, 550.1, 415, 410, 455/411, 466, 551; 370/338; 379/161; 380/247–250
See application file for complete search history.

(56) References Cited

U.S. PATENT DOCUMENTS 6,044,069 A * 3/2000 Wan ..................... 370/311
2003/0211846 A1 * 11/2003 Nagpal et al. ............ 455/434

* cited by examiner

*Primary Examiner*—Kent Chang
*Assistant Examiner*—Dinh P Nguyen
(74) *Attorney, Agent, or Firm*—James S. Finn

(57) ABSTRACT

An embodiment of the present invention provides a method, comprising using short Subscriber Station Identification (short SS ID) to identify idle mode Subscriber Stations in a wireless network. Further, in an embodiment of the present invention the short SS ID is used instead of other methods including systems such as CID in the case of connected mode users and the short SS ID is used instead of its MAC address in the case of idle mode users.

18 Claims, 2 Drawing Sheets

TECHNIQUES FOR IDENTIFICATION OF CONNECTED AND IDLE MODE USERS IN WIRELESS NETWORKS

CROSS-REFERENCE TO RELATED APPLICATION

This application claims the benefit of Provisional Patent Application Ser. No. 60.854,887, filed 26 Oct. 2006, entitled "TECHNIQUES FOR IDENTIFICATION OF CONNECTED AND IDLE MODE USERS IN WIRELESS NETWORKS", by Mohanty et al.

BACKGROUND

In a wireless communication system, a mobile user, henceforth referred to as subscriber station (SS), when powered on can be in either connected state or idle state. While in a connected state, the SS maintains association with a base station (BS), whereas in an idle state the SS does not maintain any association with the BS. Instead, it maintains an association with a paging controller (PC) that stores the up-to-date information about its location information. While in connected state or idle state, an SS needs a unique identification at the BS or PC. Currently, there are different mechanisms to implement this identification. For example, in the Institute for Electronic and Electrical Engineers (IEEE) 802.16 based WiMAX, a connected mode SS is identified through its connection identifiers (CIDs) that are assigned to it by a BS. On the other hand, in IEEE 802.16 based WiMAX, idle mode SSs are identified by their MAC IDs. Similarly, other wireless networks have their own mechanisms to identify connected and idle mode SSs. The proposed invention can be used to implement efficient identification of both connected and idle mode SSs in wireless networks. An IEEE 802.16 based WiMAX network is used as an example for the description of an embodiment of the present the invention; however, it may be applied to any other wireless networks based on other standards.

Thus, a strong need exists for efficient techniques for identification of connected and idle mode users in wireless networks.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
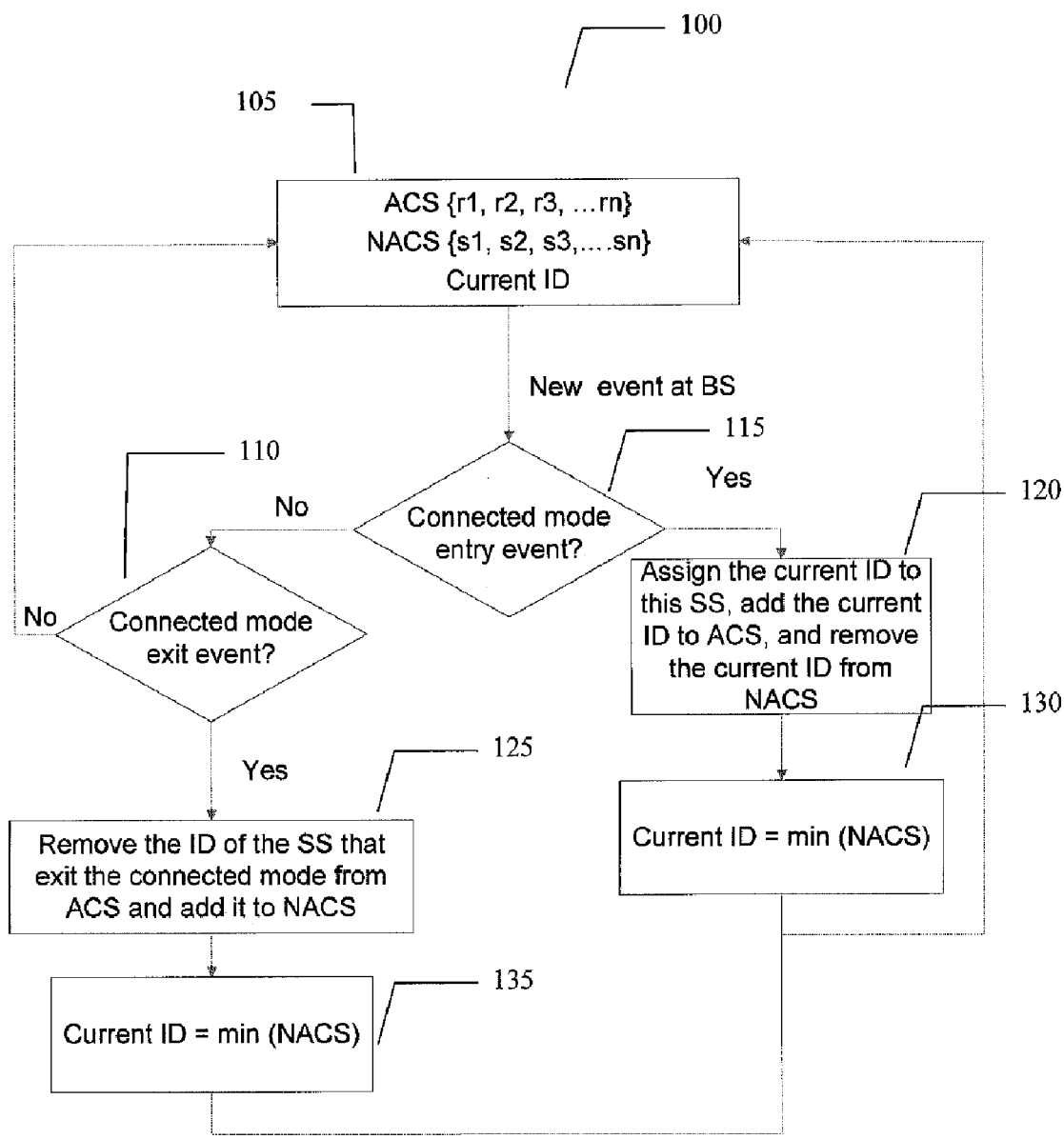
FIG. 1 is a flow chart illustrating the identification methodology for connected mode SSs in an embodiment of the present invention.
Figure 2:
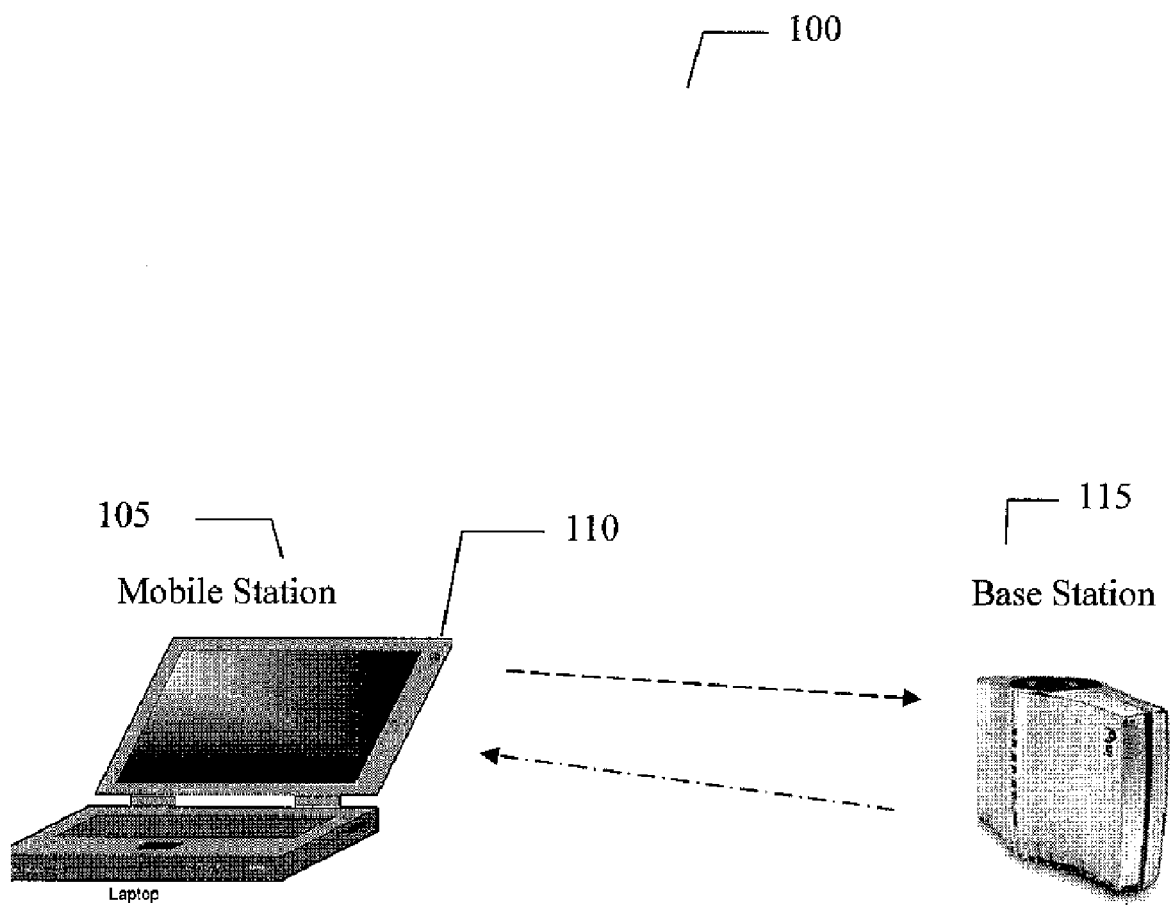
FIG. 2 illustrates a system that contains a base station (BS) and a subscriber station (SS) and illustrates an embodiment of the present invention which provides the identification of connected mode SSs.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

In the following detailed description, numerous specific details are set forth in order to provide a thorough understanding of the invention. However, it will be understood by those of ordinary skill in the art that the invention may be practiced without these specific details. In other instances, well-known methods, procedures, components, units and.or circuits have not been described in detail so as not to obscure the invention.

Embodiments of the invention may be used in a variety of applications. Some embodiments of the invention may be used in conjunction with various devices and systems, for example, a transmitter, a receiver, a transceiver, a transmitter-receiver, a wireless communication station, a wireless communication device, a wireless Access Point (AP), a modem, a wireless modem, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a network, a wireless network, a Local Area Network (LAN), a Wireless LAN (WLAN), a Metropolitan Area Network (MAN), a Wireless MAN (WMAN), a Wide Area Network (WAN), a Wireless WAN (WWAN), devices and.or networks operating in accordance with existing IEEE 802.11, 802.11a, 802.11b, 802.11e, 802.11g, 802.11h, 802.11i, 802.11n, 802.16, 802.16d, 802.16e standards and.or future versions and.or derivatives and.or Long Term Evolution (LTE) of the above standards, a Personal Area Network (PAN), a Wireless PAN (WPAN), units and.or devices which are part of the above WLAN and.or PAN and.or WPAN networks, one way and.or two-way radio communication systems, cellular radio-telephone communication systems, a cellular telephone, a wireless telephone, a Personal Communication Systems (PCS) device, a PDA device which incorporates a wireless communication device, a Multiple Input Multiple Output (MIMO) transceiver or device, a Single Input Multiple Output (SIMO) transceiver or device, a Multiple Input Single Output (MISO) transceiver or device, a Multi Receiver Chain (MRC) transceiver or device, a transceiver or device having "smart antenna" technology or multiple antenna technology, or the like. Some embodiments of the invention may be used in conjunction with one or more types of wireless communication signals and.or systems, for example, Radio Frequency (RF), Infra Red (IR), Frequency-Division Multiplexing (FDM), Orthogonal FDM (OFDM), Orthogonal Frequency-Division Multiple Access (OFDMA), Time-Division Multiplexing (TDM), Time-Division Multiple Access (TDMA), Extended TDMA (E-TDMA), General Packet Radio Service (GPRS), Extended GPRS, Code-Division Multiple Access (CDMA), Wideband CDMA (WCDMA), CDMA 2000, Multi-Carrier Modulation (MDM), Discrete Multi-Tone (DMT), Bluetooth®, ZigBee™, or the like. Embodiments of the invention may be used in various other apparatuses, devices, systems and.or networks.

Although embodiments of the invention are not limited in this regard, discussions utilizing terms such as, for example, "processing," "computing," "calculating," "determining," "establishing", "analyzing", "checking", or the like, may refer to operation(s) and.or process(es) of a computer, a computing platform, a computing system, or other electronic computing device, that manipulate and.or transform data represented as physical (e.g., electronic) quantities within the computer's registers and.or memories into other data similarly represented as physical quantities within the computer's registers and.or memories or other information storage medium that may store instructions to perform operations and.or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

As discussed earlier, connected mode users are identified at the BS, whereas idle mode SSs are identified at the PC. The implementation of the identification methodology for the connected mode SSs is described first. Then, its application to identify idle mode SSs is provided.

In an embodiment of the present invention, the BS controls the issuance of IDs to the connected mode SSs. It maintains two sets of identifiers: assigned connected set (ACS) and non-assigned connected set (NACS). The ACS contains the IDs that are already assigned to currently connected SSs, whereas NACS contains the IDs that are not assigned to any SSs. Thus, the IDs in NACS may be assigned to SSs that will be connected to the BS in future.

An SS may be associated with a BS because of any one of the following events, henceforth referred to as connected mode entry events. It is understood that there can be other connected mode entry events and any number of connected mode entry events and the present invention is applicable for all connected mode entry events. Thus, the three connected mode events provided herein are merely illustrative for an embodiment of the present invention.

1. after it powers on;
2. when it transition from idle mode to connected mode; and
3. when it handoff from another BS.

When an SS gets associated with the BS, the BS assigns the lowest available ID in NACS set, henceforth referred to as current ID, to this newly connected mode SS.

A BS removes a particular ID from ACS set and puts that into the NACS set when the connected mode SS with that ID carries out one of the following actions, henceforth referred to as connected mode exit events. Again, it is understood that there can be other connected mode entry events and any number of connected mode entry events and the present invention is applicable for all connected mode entry events. Thus, the three connected mode events provided herein are merely illustrative for an embodiment of the present invention.

1. Handoffs to another BS;
2. Enters to idle mode; and
3. Powers off.

The ID of a connected mode SS may remain the same as long as it is connected to one particular BS. However, when it moves to another BS it may be assigned a different ID. Thus, for connected mode SS, the IDs are unique in one BS coverage area.

It may be noted that the connected mode ID may be used to identify connected mode users. For example, it may be used in the header part of a MAC protocol data unit (PDU) to identify the SS that is the intended receiver of that PDU. It may be also be used to address one or more connected mode SSs as a part of any other message transmitted by the BS.

In an embodiment of the present invention, if the maximum possible ID for a connected mode SS is N, the maximum possible ID for connected mode SS depends on the maximum number of SSs that are expected to be served by a BS at a particular time. The exact value of N may be different for different wireless networks.

Turning now to the figures, FIG. 1 at 100 is a flow chart illustrating the identification methodology for connected mode SSs in an embodiment of the present invention. When a BS is initialized, it has an empty ACS set and NACS set that has all possible IDs for connected mode SS. Thus, upon initialization, ACS={ }, NACS={1, 2, 3, 4, ..., N} 105. After 105, at 115 a determination is made if a connected mode entry event occurs. If yes at 115, at 120 assign the current ID to this SS, add the current ID to ACS, and remove the current ID from NACS. Then at 130 set current ID=min (NACS) and return to 105. If no at 115, at 110 a determination if a connected mode exit even is made. If no, a return to 105 occurs. If yes at 110, at 120 remove the ID of the SS that exited the connected mode from ACS and add it to NACS. Then, at 135 set current ID=min (NACS) and return to 105.

For example, upon initialization, i.e., when no SS is connected with a BS, current ID=min (NACS)=1. The BS assigns ID 1, to the first SS that gets connected to it. After this, ACS={1} and NACS={2, 3, 4, ... N}. Now the current ID=2. If another SS gets connected to the BS, the BS assigns ID=2 to it and after this, ACS={1, 2} and NACS={3, 4, ... N}. The new value of current ID=3. Similarly, after the third SS gets connected to the BS ACS={1, 2, 3}, NACS={4, ... N} and current ID=4. At this time, if SS with ID=2, exit from the connected mode through any one of the connected mode exit events, then ID=2 is removed from the ACS and added to the NACS. Thus, after this event ACS={1, 3} and NACS={2, 4, 5, 6 ... N}. Now, the current ID=2.

The implementation of identification assignment for idle mode SSs is similar to that of connected mode SS. As pointed out earlier, the ID of an idle mode SS remains the same as long as it is in one paging area (PA). When, an idle mode SS moves from one PA to another, its ID may change. A PC maintains two sets of identifiers for each PA for which it is responsible: assigned idle set (AIS) and non-assigned idle set (NAIS) of identifiers. The AIS contains the IDs that are already assigned to currently idle SSs, whereas NAIS contains the IDs that are not assigned to any SSs. Thus, the IDs in NAIS can be assigned to SSs that will enter as idle mode SSs in the future.

An SS gets associated with a PC because of any one of the following events, henceforth referred to as idle mode entry events. It is understood that there may be other idle mode entry events and the present invention is applicable for all idle mode entry events.

1. After entering to idle mode from connected mode; and
2. when it moves into the PA managed by the PC from another PA managed by a different PC while in idle mode.

A PC assigns the lowest available ID in NAIS set to a new idle mode SS upon latter's idle mode entry event.

A PC removes a particular ID from an AIS set and puts that into the NAIS set when the idle mode SS with that ID carries out one of the following events, henceforth referred to as idle mode exit events.

1. Moves to another PA;
2. Enters to connected mode; or
3. Powers off.

The operation of assignment of identification to idle mode users is similar to that the connected mode users discussed earlier. The differences are: the identification of idle mode users is coordinated by the PC instead of BS and it may have different value N that shows the maximum number of idle mode users in a PA.

Encoding of the IDs

A novel encoding scheme of the IDs for connected and idle mode SSs is discussed below. The encoded IDs have two parts: a fixed length part of L bits and an offset part with variable number of bits as shown in the table below. The numerical value of the ID=2^(L−1)+M. L depends on the maximum number of IDs required, i.e., N in the earlier discussion and can be expressed as L=greatest integer [$\log_2(\log_2(N))$]. The value in the length field shows the length of the offset field.

| LENGTH($L$) | OFFSET = $M$ |

Example: We consider different scenarios with different number of users in idle mode and the reduction in overhead associated with user identification in MOB-PAG-ADV message is shown below when an embodiment of the present invention is used.

| Number of idle mode users | Number of bits used currently to address idle mode users in MOB-PAG-ADV message | Number of bits used when the invention is used to address idle mode users in MOB-PAG-ADV message | Number of bits saved to address idle mode users | Percentage of overhead saving when invention is used |
|---|---|---|---|---|
| 100 | 48 | 9 | 39 | 81 |
| 200 | 48 | 10 | 38 | 79 |
| 500 | 48 | 11 | 37 | 77 |
| 1000 | 48 | 12 | 36 | 75 |
| 2000 | 48 | 13 | 35 | 72 |
| 4000 | 48 | 14 | 34 | 70 |
| 8000 | 48 | 15 | 32 | 66 |

As set forth below, in some embodiments of the present invention, the IDs for connected as well as idle mode users may be referred as short Subscriber Station ID (short SS ID).

Concatenation of Short SS IDs

The average number of bits may be further reduced in cases where one particular message contains several short SS IDs. One example, although the present invention is not limited in this respect, is MOB-PAG-ADV message in which several idle mode SSs may be addressed. In this case, SSs with short SS IDs of same length can be concatenated so that they have only one length field. For illustration assume that one MOB-PAG-ADV message contains 10 short SS IDs of which five have L1 number of bits, 3 have L2 number of bits and rest have different lengths. In this case, if the offset of the short SS IDs are s1, s2, . . . , s10, then they can be encoded as shown in the following table.

Embodiments of the present invention have several advantages, including:
1. Use of short SS ID to identify idle mode SSs instead of their MAC addresses significantly reduces the overhead in paging messages.
2. Use of short SS ID to identify connected mode SSs reduces the overhead in data and control packets exchanged between the BS and a connected mode SS.
3. Use of the proposed encoding scheme makes the average overhead required to encode the IDs proportional to the number of IDs used at a particular time.
4. When multiple short SS IDs are present in one message, they can be concatenated to further reduce the average number of bits per user IDs.

Some embodiments of the invention may be implemented by software, by hardware, or by any combination of software and.or hardware as may be suitable for specific applications or in accordance with specific design requirements. Embodiments of the invention may include units and.or sub-units, which may be separate of each other or combined together, in whole or in part, and may be implemented using specific, multi-purpose or general processors or controllers, or devices as are known in the art. Some embodiments of the invention may include buffers, registers, stacks, storage units and.or memory units, for temporary or long-term storage of data or in order to facilitate the operation of a specific embodiment.

Some embodiments of the invention may be implemented, for example, using a machine-readable medium or article which may store an instruction or a set of instructions that, if executed by a machine, for example, by a system, by a station, by a processor or by other suitable machines, cause the machine to perform a method and.or operations in accordance with embodiments of the invention. Such machine may include, for example, any suitable processing platform, computing platform, computing device, processing device, computing system, processing system, computer, processor, or the like, and may be implemented using any suitable combination of hardware and.or software. The machine-readable medium or article may include, for example, any suitable type of memory unit, memory device, memory article, memory medium, storage device, storage article, storage medium and.or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Re-Writeable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and.or interpreted programming language, e.g., C, C++, Java, BASIC, Pascal, Fortran, Cobol, assembly language, machine code, or the like.

Embodiments of the present invention may provide a machine-accessible medium that provides instructions, which when accessed, cause a machine to perform operations comprising using short Subscriber Station Identification

| L1 | 5 | S1 | S2 | S3 | S4 | S5 | L2 | 3 | S6 | S7 | S8 | L3 | S9 | L4 | S10 |

(short SS ID) to identify idle mode Subscriber Stations instead of a MAC addresses in a wireless network. Further, in an embodiment of the present invention the machine-accessible medium may further comprise further instructions, which when accessed, cause a machine to perform operations further comprising concatenating said SS IDs when multiple SS IDs of same length are used in the same message so that they have only one length field.

A further embodiment of the present invention provides a system 100, comprising a base station (BS) 115 and a subscriber station (SS) 105, which may have antenna 110, operable to communicate with said base station (BS), wherein said SS is adapted to use short Subscriber Station Identification (short SS ID) to identify idle mode SSs instead of their MAC addresses in a wireless network.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

We claim:

1. An apparatus, comprising:
    a transceiver adapted to use short Subscriber Station Identification (short SS ID) to identify Subscriber Stations (SSs) in a wireless network; and
    wherein said transceiver uses an encoding scheme of IDs for connected and idle mode SSs with said IDs having a fixed length part of L bits and an offset Part M with variable number of bits and wherein a numerical value of said ID=$2^{(L-1)}$+M with L depending on the maximum number of IDs required and the value in the length field shows the length of the offset field and wherein L=greatest integer [log 2 (log 2(N))] and the maximum possible ID for a connected mode SS is N.

2. The apparatus of claim 1, wherein said short SS ID is used instead of other methods including systems such as CID in the case of connected mode users and said short SS ID is used instead of its MAC address in the case of idle mode users.

3. The apparatus of claim 1, wherein when multiple short SS IDs are used in the same message, said short SS IDs having same length are concatenated so that they have only one length field.

4. The apparatus of claim 1, wherein said short SS ID is used to identify idle mode SSs instead of their MAC address thereby significantly reducing the overhead in a paging message.

5. The apparatus of claim 1, wherein said short SS ID is used to identify connected mode SSs thereby reducing the overhead in data and control packets exchanged between the BS and a connected mode SS.

6. The apparatus of claim 1, wherein said short SS ID uses an encoding scheme that makes the average overhead required to encode the IDs proportional to the number of IDs used at a particular time.

7. A method, comprising:
    using short Subscriber Station Identification (short SS ID) to identify idle mode Subscriber Stations (SS) in a wireless network; and
    wherein said transceiver uses an encoding scheme of IDs for connected and idle mode SSs with said IDs having a fixed length part of L bits and an offset part M with variable number of bits and wherein a numerical value of said ID=$2^{(L-1)}$+M with L depending on the maximum number of IDs required and the value in the length field shows the length of the offset field and wherein L=greatest integer [log 2 (log 2(N))] and the maximum possible ID for a connected mode SS is N.

8. The method of claim 7, wherein said short SS ID is used instead of other methods including systems such as CID in the case of connected mode users and said short SS ID is used instead of its MAC address in the case of idle mode users.

9. The method of claim 7, concatenating said short SS IDs when multiple short SS IDs having same length are used in the same message so that they have only one length field.

10. The method of claim 7, further comprising using said short SS ID to identify idle mode SSs instead of their MAC address thereby significantly reducing the overhead in paging message.

11. The method of claim 7, further comprising using said short SS ID to identify connected mode SSs thereby reducing the overhead in data and control packets exchanged between the BS and a connected mode SS.

12. The method of claim 7, further comprising using a short SS ID encoding scheme that makes the average overhead required to encode the IDs proportional to the number of IDs used at a particular time.

13. A computer readable medium, limited to non-transitory, encoded with computer executable instructions, which when accessed, cause a machine to perform operations comprising:
    using short Subscriber Station Identification (short SS ID) to identify Subscriber Stations (SSs) in a wireless network; and
    wherein said transceiver uses an encoding scheme of IDs for connected and idle mode SSs with said IDs having a fixed length part of L bits and an offset part M with variable number of bits and wherein a numerical value of said ID=$2^{(L-1)}$+M with L depending on the maximum number of IDs required and the value in the length field shows the length of the offset field and wherein L=greatest integer [log 2 (log 2(N))] and the maximum possible ID for a connected mode SS is N.

14. The computer readable medium, limited to non-transitory, of claim 13, wherein said short SS ID is used instead of other methods including systems such as CID in the case of connected mode users and said short SS ID is used instead of its MAC address in the case of idle mode users.

15. The computer readable medium, limited to non-transitory, of claim 13, further comprising further instructions, which when accessed, cause a machine to perform operations further comprising concatenating said short SS IDs when multiple short SS IDs having same length are used in the same message so that they have only one length field.

16. The computer readable medium, limited to non-transitory, of claim 13, further comprising further instructions, which when accessed, cause a machine to perform operations further comprising using said short SS ID to identify idle mode SSs instead of their MAC address thereby significantly reducing the overhead in a paging message.

17. The computer readable medium, limited to non-transitory, of claim 13, further comprising further instructions, which when accessed, cause a machine to perform operations further comprising using said short SS ID to identify connected mode SSs thereby reducing the overhead in data and control packets exchanged between the BS and a connected mode SS.

18. The computer readable medium, limited to non-transitory, of claim 13, further comprising further instructions, which when accessed, cause a machine to perform operations further comprising using a short SS ID encoding scheme that makes the average overhead required to encode the IDs proportional to the number of IDs used at a particular time.

* * * * *